United States Patent [15] 3,646,509
Hughes et al. [45] Feb. 29, 1972

[54] METHOD FOR FIELD STACKING SEISMIC DATA AND SYSTEM USING WRITE AFTER READ BULK DATA STORAGE

[72] Inventors: John M. Hughes; Stanley E. Lehnhardt, both of Dallas; Byron C. Lochridge, Richardson, all of Tex.

[73] Assignee: Texas Instruments Incorporated, Dallas, Tex.

[22] Filed: Aug. 8, 1969

[21] Appl. No.: 849,605

Related U.S. Application Data

[63] Continuation of Ser. No. 694,530, Dec. 29, 1967, abandoned.

[52] U.S. Cl. ....................340/15.5 MC
[51] Int. Cl. ....................G01v 1/28
[58] Field of Search ....................340/15.5 MC

[56] References Cited

UNITED STATES PATENTS 2,897,476 7/1959 Widess....................340/15.5
3,340,499 9/1967 Hadley....................340/15.5
3,525,072 8/1970 Born et al. ....................340/15.5

*Primary Examiner*—Malcolm F. Hubler
*Assistant Examiner*—N. Moskowitz

[57] ABSTRACT

A seismic digital field stacking method and system in which the first seismic shot of a stack is initiated from a blast command recorded on a conventional magnetic tape which moves past a read head and then past a write head. The seismic response signal is detected and digitalized and temporarily delayed in the buffer of a digital computer for a predetermined number of words, and then recorded on the magnetic tape. After the entire seismic response from the first shot has been recorded on the magnetic tape beginning at a delayed point after the blast command, the tape is rewound. When the blast command again passes the read head, the second shot of the stack is initiated and the tape continues to run. The seismic response from the second shot is again digitalized and temporarily stored in the buffer of the digital computer while the computer performs conventional quality assurance calculations as the tape continues to run. When the first data word is read from the magnetic tape by the read head, it is stored in a transfer register while the computer performs the stacking circulations, taking into account the quality assurance program, and then updates the data word stored in the transfer register. Then as the next data word is read from the tape as it passes the read buffer, the updated word in the transfer register is rewritten on the magnetic tape. The procedure is then repeated to stack the new data from the second shot with the old data from the first shot, and the entire stacking procedure repeated for all successive shots in the stack.

5 Claims, 2 Drawing Figures

Figure 1:
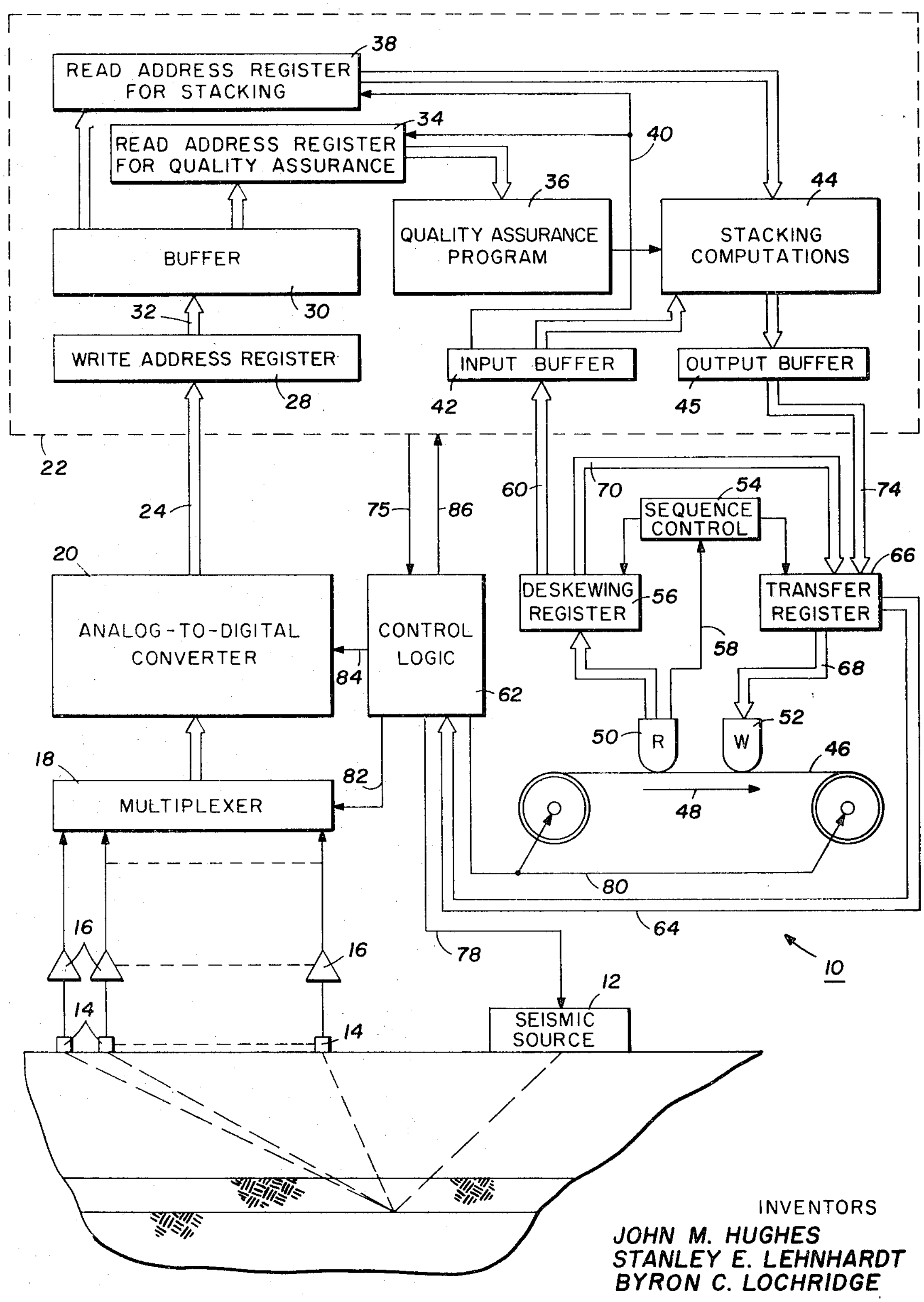

INVENTORS
JOHN M. HUGHES
STANLEY E. LEHNHARDT
BYRON C. LOCHRIDGE

E. Miskey Hubbard
ATTORNEY

METHOD FOR FIELD STACKING SEISMIC DATA AND SYSTEM USING WRITE AFTER READ BULK DATA STORAGE

This application is a continuation of application Ser. No. 694,530 filed Dec. 29, 1967, now abandoned. This invention relates generally to seismic data processing, and more particularly relates to a method and system for stacking digital seismic data in real time in the field using conventional stacking programs heretofore practical only in a data processing center having a computer with a very large memory.

It has been common practice for a number of years to stack seismic data in order to improve the signal-to-noise ratio as well as for various other reasons. In general, this is achieved by recording the seismic response from a series of seismic shots and then combining the values of the seismic response signals at common depth points as determined by elapsed time after the shot. Since noise tends to be random and the signal tends to be repetitive, the signal-to-noise ratio is enhanced by the combination. The common depth point values can be combined by addition, multiplication, or any other suitable method. In order to achieve the most reliable data from the stacking procedure, various quality assurance programs have been devised to check the quality of the data in various ways, and to normalize the amplitudes of the data from one shot to the next by various multiplication factors derived by processing selected time blocks of the data.

It has heretofore been standard procedure to record the seismic response from each shot that occurs at each of 24 detectors, commonly referred to as a spread, arrayed essentially in a straight line. The analog seismic responses detected by each of the 24 sensors are then applied through 24 channels to a multiplexer which converts the multichannel analog data to single channel analog data. The single channel analog data is applied to an analog-to-digital converter which assigns a digital value to the sampled amplitude. Thus the output of the analog-to-digital converter is typically a series of data blocks each identified by a digital timing word followed by 24 digital data words. Each digital data word of each data block represents the amplitude of one of the 24 analog signals detected at one of the 24 sensors at substantially the same point in time.

The digital data from each of a series of shots has heretofore been recorded sequentially on magnetic tape which is then transported to a central data processing center for stacking and other processing. This requires the use of a very large number of tapes in day to day operation in order to store the enormous volume of data while it is collected, transported to the data processing center, processed, and the tapes returned to the field. In addition, this procedure requires considerable lapsed time before processed data is available for interpretation. It is impractical to transport a general purpose computer along with the field equipment because of the very large memory capacity required to process the data.

This invention is concerned with a method and apparatus for stacking seismic data in real time in the field using any selected quality assurance program that can be used in a data processing system. This is achieved by temporarily delaying the digital data in a buffer as it is collected for a sufficient time to perform quality assurance calculations on the delayed data, then reproducing the words of previously recorded digital data from a record medium, performing stacking computations based on the reproduced word and the corresponding delayed word and the stacking factors derived by the quality assurance program, and then recording the combined or stacked words on a record medium.

Figure 2:
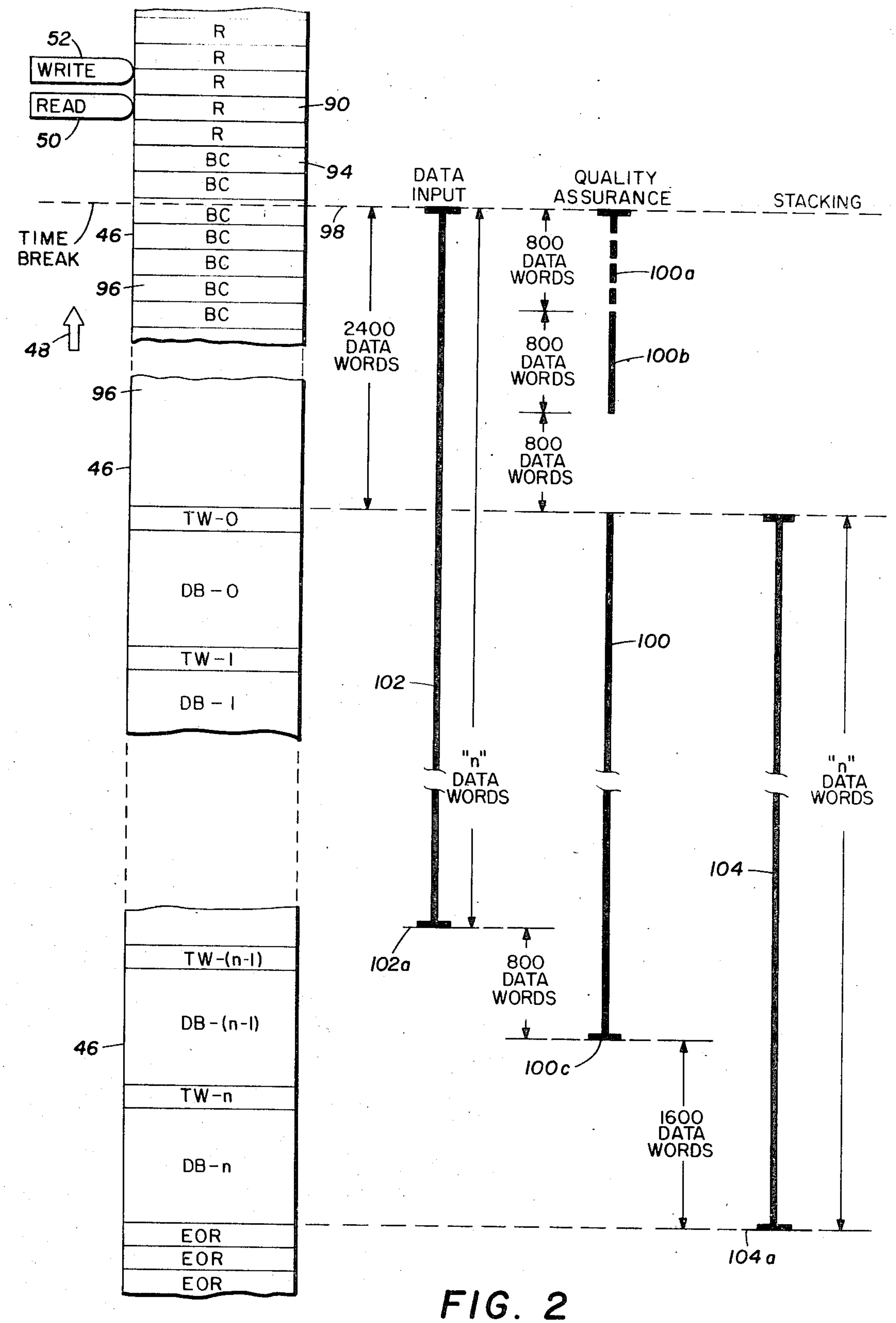

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIG. 1 is a schematic block diagram of a system in accordance with the present invention; and FIG. 2 is a schematic timing diagram which assists in illustrating the method of the present invention.

Referring now to FIG. 1, a system in accordance with the present invention is indicated generally by the reference numeral 10. The system 10 is comprised of a seismic shot generator represented at 12 which is adapted to produce an acoustic disturbance of sufficient magnitude that its reflections from subterranean interfaces can be detected. The shot generator may be of any conventional type for either marine or land operation. The seismic energy reflected by the earth is detected by a conventional spread of geophones 14. There are typically 24 geophones arrayed in a line in a manner known in the art. The output from each of the geophones 14 is amplified by an amplifier 16 and applied to a suitable conventional multiplexer 18 which converts the 24 channels of analog data to a single channel of analog data by sequentially sampling each of the analog signals. The single channel of multiplexed analog signals is then fed to a conventional seismic analog-to-digital converter 20 where each multiplex sample is converted to a digital word.

The analog-to-digital converter 20 typically produces a series of data blocks each consisting of 24 digital data words preceded by an individually identifiable digital timing word. Each data word typically has 15 binary bits. A digital word is typically produced every 125 microseconds. The digital words from the converter 20 are applied to a general purpose digital computer 22 by way of 15 parallel bit lines represented by channel 24.

The computer 22 may be a model No. TI2502 digital computer manufactured by Texas Instruments Incorporated, Houston, Texas, for example. The digital computer is programmed to carry out the functions represented by the block diagram within the dotted outline 22. The computer includes a cyclic data write address register 28 which specifies the addresses of 2400 words in the magnetic core of the computer which forms a data buffer 30 at which the next incoming data word is to be stored. The analog-to-digital converter 20 produces an interrupt signal in data write channel 32 just before each data word is presented to the computer 22. Upon receipt of the data write clock interrupt, the computer program proceeds to a data write subroutine in which the word is written into the buffer 30 at the address specified by the data write address register, and the data write address register is then incremented one count preparatory to receiving the next word. After the data write address register has cycled through all 2400 words of the data buffer, the data write address returns to the address of the original word so that the incoming word is written over the previously stored word.

A cyclic read address register 34 determines which word is to be nondestructively read from the buffer 30 for the quality assurance program represented at 36. The quality assurance program 36 may involve any desired calculations to check out the quality of the incoming data being stored in the buffer 30. For example, the quality assurance program 36 may reject portions of the incoming data stored in the buffer 30 or may generate stacking factors for properly weighting the incoming data.

A second cyclic read address register 38 nondestructively reads words stored in the buffer 30 which are to be stacked with previously recorded data as will presently be described. The read address register is incremented in response to a strobe pulse received on control line 40 from an input buffer 42. The word in the buffer 30 identified by the read address register 38 is then supplied for the stacking computation program represented at 44. The binary word representative of the stacked value is then set up in an output buffer 45.

A magnetic recording tape 46 is moved in the direction of arrow 48 past a read head 50 and a write head 52. The read and write heads 50 and 52 may be of conventional design and are adapted to read and write binary logic words in which the bits are stored in a single line extending transversely of the magnetic tape 46. A center bit of each word on the tape 46 is applied directly to a sequence control circuit 54 on channel 58 and the remainder of the bits are applied to a deskewing register 56 which is used to eliminate the effects resulting from any skewed relationship between the read head 50 and the information recorded on tape 46. A short predetermined time after the timing bit pulse is received by the sequence control circuit 54 on channel 58, the digital word is gated from the deskewing register 56 to the input buffer 42 of the computer 22 by way of channel 60. Immediately after the word is gated from the deskewing register 56 to the input buffer 42, the sequence control circuit 54 first gates the word stored in a transfer register 66 to the write head 52 through channel 68 so that the word then stored in the transfer register is recorded on the magnetic tape 46. Next, the sequence control circuit 54 enables the transfer register 66 so that it can receive a word from the deskewing register 56 by way of channel 70. The word received from the deskewing register is then retained in the transfer register 66 until the next word is read from the tape 46 and a new sequence is initiated by the receipt of a timing pulse by the sequence control circuit 54. During the period the word from the deskewing register is in the transfer register, which is about 104 microseconds, the word in the transfer register can be updated from the output buffer 45 by way of channel 74. Thus, any word read by read head 50 is automatically transferred to the transfer register and automatically rewritten on the tape 46 unless updated by the computer. This eliminates the necessity of using computer time to rewrite on the tape.

If the word stored in the transfer register 66 is a blast command, the control logic detects the blast command by channel 64 and generates an electrical pulse which activates the seismic energy generator 12 to induce seismic energy into the earth.

The operation of the entire system is automatically controlled by the computer 22 acting through channel 75 to the control logic 62. The seismic energy generator 12 is controlled through channel 78, the transport for tape 46 through channel 80, the multiplexer through channel 82, and the analog-to-digital converter 20 through channel 84. The control logic network 62 also interfaces the remainder of the system with the computer as represented by channel 86.

The format of the digital words recorded on tape 46 is represented in the schematic diagram of FIG. 2. A series of identifying reference words 90 are recorded on the tape 46 by the computer 22 prior to the start of a stacking operation which identify the stack that is to be compiled. The reference words 90 also serve as a reference point to which the tape is automatically returned after each shot. The first reference word 90 follows the last preceding data word on the tape 46 by a substantial distance to allow for the advancement of the entire record on the tape as each successive shot is stacked as will presently be described. Reference word 90 is followed by a series of blast command words 94 which serve as the basic timing mark for the stack. After a blank space 96 equal to more than 300 milliseconds of tape travel, timing word TW–O is recorded followed by data block DB–O. Data block DB–O includes 2400 digital words, one for each sampled value of the 24 respective analog waveforms made at substantially the same time. Data blocks DB–1, DB–2, etc., follow in succession until the last data block DB–n is reached. Then a series of identical end of record words EOR are recorded in succession. There should be at least as many EOR words as the number of shots to be recorded, since the last word from the record is not rewritten on the tape during each pass as will presently be described.

STACKING PROCEDURE

First Shot

When the system is set in operation for the first shot, the tape 46 begins to move forward. The computer 22 originates a series of reference words 90 followed by a series of blast command words 94 which are recorded on the tape 46 through output buffer 45, channel 74, transfer register 66 and channel 68. The control logic 62 identifies each of the blast command words and, after counting a predetermined number of blast commands, activates the seismic source 12 to induce seismic energy in the earth. The tape 46 continues to run at a constant rate. When the time break is received, the analog-to-digital converter 20 starts sending the real time data to the computer 22. This occurs approximately at the point of travel of the tape 46 represented by the dotted line 98 in FIG. 2 and time line 102 represents the period during which "$n$" data words are received in real time by the computer. Each data word is preceded by an interrupt signal which causes the computer 22 to revert to a data write subroutine. After each data word is stored in the data buffer 30, the data write address register 28 is incremented one count. Each succeeding digital data word is preceded by an interrupt signal which causes the computer 22 to revert to the data write subroutine to store the incoming data word in the address of the data buffer 30 specified by the data write address register 28, and then the data write address register is incremented one count each time. This procedure is repeated on successive data words until the data buffer 30 is full, then the data write address register is returned to its original count and the new data written over the data previously recorded in the buffer. This cyclic procedure continues uninterrupted until the entire shot record is complete and $n$ data blocks have been stored in the data buffer 30, as represented by line 102A on the tape 46 in FIG. 2. The read address register for quality assurance then addresses the data words stored in the buffer and performs quality assurance calculations.

The procedure during the first shot in each stack is different from the procedure during succeeding shots in the stack and is as follows. The read address register 38 for stacking is initially incremented to the same address as the data write address register 28. After 2400 data words have been stored in the data buffer 30, the words in the data buffer 30 are read out on a first-in, first-out basis by the stacking read address register 38, which is operated by the computer program, and are modified, if required, by the stacking program based on the quality assurance program. The data words are then recorded on the tape 46 through the output buffer 45 and the transfer register 66 in timed sequence with the interrupt signals from the converter 20. This results in the space 96 on the tape 46 between the last blast command 94 and the first timing word TW–O that is 2400 data words in length at the speed of the tape on that particular run, which is approximately 300 milliseconds. Thus, the data words including the timing words, are recorded on the tape 46 in the same sequence and time period as received from the analog-to-digital converter 20, but after a delay of approximately 300 milliseconds during which time the data words are stored in the data buffer.

Second and Subsequent Shots

The magnetic tape 46 is then rewound to the reference words 90 prior to the start of the second shot record. The write address register, the read address register for quality assurance and the read address register for stacking are each set to the same address in the data buffer. As the tape 46 is started, the reference words 90 and blast command words 94 are automatically read and rewritten on the tape through deskewing register 56 and transfer register 66. The control logic 62 again detects the blast command words 94 and after the same predetermined number initiates the seismic energy source 12. When the time break occurs, the computer 22 enables channel 24 so that the clock interrupts from the analog-to-digital converter 20 are received and the computer proceeds to store the data in the data buffer during the period represented by time line 102. As each data word is stored in the data buffer 30, the data write address register 28 is incremented. For the first 800 data words stored in the data buffer 30, the read address register for quality assurance is also incremented as represented by the dotted portion 100*a* of time line 100 in FIG. 2. Then as the second 800 data words are stored in the data buffer 30, the words are read by the read address register for quality assurance 34 and quality assurance calculations performed, as represented by the segment 100*b* of time line 100. This is used to determine the quality of the incoming data and to establish multiplication factors for stacking in a manner well known in the art. During this time the quality assurance read address is incremented each time that an interrupt is received on channel 32 from the analog-to-digital converter so that after 1600 data words have been stored in the data buffer, both the data write address register 28 and the read address register for quality assurance 34 have the same address count. Real time data then continues to be received in the data buffer 30, but no further quality assurance calculations are performed until timing word TW–O is read from the tape 46 by read head 50. This period is approximately 800 data words, but will vary with variations in the speed of tape 46 from one shot to the next. The 800 data word period is chosen to accommodate the worst case. Then as the successive data words are read from the tape 46 and transferred to the input buffer 42, an interrupt signal is generated within the computer 22, as represented by channel 40, which causes the word in the data buffer addressed by the count of the read address register 34 for quality assurance to be read out so that quality assurance operations will continue, and the read address register 34 incremented. The interrupt signal also causes the word addressed by the count of the read address register 38 for stacking to be made available for stacking computations. Stacking computations are then performed based on the data word in input buffer 42 and the word in the buffer 30 addressed by read address register 38 to update the word stored in the output buffer 45. The stacking computations are based on the multiplication constants generated by the quality assurance program derived from the 800 data word window applicable to the data being stacked.

At the time the previous data word was read from the tape 46, a timing pulse was supplied by channel 58 directly to the sequence control circuit 54. A very short period of time thereafter, the sequence control circuit 54 first gated the word read from the tape out of the deskewing register 56 to the input buffer 42 by way of channel 60, then gated the word stored in the transfer register 66 during the previous cycle out to the write head 52 which records that word on the tape 46, then transferred the new word from the deskewing register 56 to the transfer register 66 by way of channel 70. Thus, the word in the transfer register 66 is the same as the word in the input buffer 42. After the calculations are performed, the word in the transfer register 66 is updated in accordance with the stacking computations through the output buffer 72. The updated word in the transfer register 66 will then be recorded on the tape 46 during the next cycle initiated by the timing pulse from the next successive word on the tape 46 which is supplied to the sequence control circuit 54 by way of channel 58.

This procedure is repeated until the entire data input represented by time line 102 is completed at point 102*a*. The quality assurance program continues until the read address register 34 for quality assurance reaches the same address number as the data write address register 28, which is approximately 800 data word cycles later. The stacking operation then continues until the read address register 38 for stacking also reaches the same address number, as indicated by point 104*a* on time line 104. This is approximately 1600 data words after the termination of the quality assurance program, as represented at point 100*c* on time line 100.

At this time the data stored on the tape 46 will be a partial stack including the data collected by the first and second shots of the stack. The tape 46 is then rewound before each successive shot of the stack and the same procedure repeated. A typical stack may include as many as 100 shots. Since the tape 46 travels an insignificant distance during the period that a word is read from the tape by the read head 50 and rewritten on the tape by the write head 52, each word is written back on the tape at a point advanced from its previous position a distance approximately equal to the distance between the read head 50 and write head 52. For example, if the space between the read and write heads is 0.3 inch, the tape 46 should be clear of any data for a distance of at least 30 inches in advance of the first reference word 90 for a stack of 100 shots. Also, since there is no timing signal to cause the last EOR word to be read out of the transfer register 66, the last EOR word is dropped from the tape during each recording cycle. Therefore, there should be at least as many EOR words as shots in the stack in order to insure that an EOR word will always be available for recognition by the control logic 62 through channel 64 to cause the tape 46 to be automatically rewound in preparation for the next shot.

Although preferred embodiments of the invention have been described in detail, it is to be understood that various changes, substitutions, and alterations can be made in the steps and components of the invention without departing from the spirit and scope of the invention as defined by the appended claims.

What is claimed is:

1. In a system for field stacking digital seismic data in real time while performing quality assurance processing, the combination of:

a. means for collecting digital seismic data in real time, b. magnetic tape storage means for simultaneously reproducing and recording digital seismic data, said magnetic tape storage means including means for writing on and reading from said magnetic tape, transport means for moving the magnetic tape past the read means, a transfer register for temporarily storing a digital word to be written on said magnetic tape, gating means for gating data from said transfer register to the write means to record said data on said magnetic tape and for gating data read from said tape to said transfer register, a second register for receiving and storing the digital data reproduced by said read means, and sequence control means responsive to the word reproduced by said read means for first transferring the word stored by the transfer register to said write means and then transferring the word stored in said second register to said transfer register, and c. digital circuit means including 1. means for temporarily storing a segment of said digital seismic data as it is collected,
2. means for performing quality assurance calculations on the segment of the digital seismic data stored to produce and store stacking factors applicable to said stored data,
3. means for operating the magnetic storage means to reproduce previously stored digital seismic data,
4. means for performing stacking computations to stack the reproduced digital seismic data with the temporarily delayed digital seismic data based on the stored stacking factors, and
5. means for operating said magnetic storage means to simultaneously magnetically record said stacked digital seismic data.

2. In a seismic data processing system, the combination of:

a magnetic tape, read means for reading digital data words from the magnetic tape, write means for writing digital data words on the magnetic tape, transport means for moving the magnetic tape first past the read means, then past the write means, a first register for receiving a digital data word read from the magnetic tape by the read means, a second register for storing a digital data word to be recorded on the magnetic tape by the write means, and sequence control means responsive to a timing signal reproduced from the magnetic tape by the read means for sequentially transferring the digital data word in the second register to the write means for recordation on the magnetic tape and transferring the digital data word from the first register to the second register.

3. The combination defined in claim 2 further characterized by:

a digital computer having an input buffer and an output buffer, means for transferring a digital data word read from the magnetic tape by the read means to the input buffer, and means for transferring a digital data word form the output buffer to the second register.

4. The combination defined in claim 3 wherein:

the sequence control means is adapted to enable the transfer of a digital data word from the output buffer to the second register during a period after a data word is transferred to the second register and before the word is transferred to the write means.

5. The combination defined in claim 4 further characterized by:

means for collecting digital seismic data in real time and supplying the digital seismic data to the computer, and wherein the computer is programmed to delay the received digital seismic data for a period sufficient to process the delayed portion of the data, receive data words in the input buffer as they are reproduced by the read means and generate a data word in the output buffer for updating the data word in the second register based upon the data word received in the input buffer and the processed portion of the real time data whereby the updated data will be stored on the magnetic tape.

* * * * *